United States Patent
Shuster

(10) Patent No.: US 8,572,158 B2
(45) Date of Patent: *Oct. 29, 2013

(54) DISTRIBUTED COMPUTING BY CARRIER-HOSTED AGENT

(75) Inventor: Gary Stephen Shuster, Fresno, CA (US)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/342,838

(22) Filed: Jan. 3, 2012

(65) Prior Publication Data

US 2012/0173605 A1 Jul. 5, 2012

Related U.S. Application Data

(63) Continuation of application No. 12/886,827, filed on Sep. 21, 2010, now Pat. No. 8,117,258, which is a continuation of application No. 10/151,810, filed on May 20, 2002, now Pat. No. 7,801,944.

(51) Int. Cl.
*G06F 15/173* (2006.01)
*G06F 15/16* (2006.01)

(52) U.S. Cl.
USPC ........... 709/202; 709/224; 709/218; 709/203; 709/219; 709/201; 709/206; 709/217

(58) Field of Classification Search
USPC .................................................. 709/203, 219
See application file for complete search history.

(56) References Cited

U.S. PATENT DOCUMENTS

| | | |
|---|---|---|
| 5,031,089 A | 7/1991 | Liu et al. |
| 5,442,791 A | 8/1995 | Wrabetz et al. |
| 5,557,798 A | 9/1996 | Skeen et al. |
| 5,761,421 A | 6/1998 | van Hoff et al. |
| 5,903,728 A | 5/1999 | Semenzato |
| 5,909,559 A | 6/1999 | So |
| 5,978,829 A | 11/1999 | Chung et al. |
| 5,999,944 A | 12/1999 | Lipkin |
| 6,279,034 B1 | 8/2001 | Jarriel et al. |
| 6,308,208 B1 | 10/2001 | Jung et al. |
| 6,336,139 B1 | 1/2002 | Feridun et al. |
| 6,604,135 B1 * | 8/2003 | Rogers et al. ................ 709/217 |
| 6,732,141 B2 | 5/2004 | Ellis |
| 6,757,730 B1 | 6/2004 | Lee et al. |
| 6,842,899 B2 | 1/2005 | Moody et al. |

(Continued)

OTHER PUBLICATIONS

Yair Amir, Baruch Awerbuch, and R. Sean Borgstrom, "A Cost-Benefit framework for online management of a metacomputing system," Decision Support Systems 28 (2000), 2000, pp. 155-164.

(Continued)

*Primary Examiner* — Jude Jean Gilles

(57) ABSTRACT

A method for operating a host layer of a distributed computing system on a wide area network includes attaching an agent to a client-requested carrier. The method includes receiving a request for specified content from a client node via the wide area network, and sending the content and an embedded agent to the client. The agent has program instructions configured to execute on the client node to perform a processing function that operates on raw data to produce process data. The method further includes sending the raw data to the client node and receiving the process data from the client node as it is processed by the agent. The host layer may comprise a web server hosting a web site containing consumer-oriented web pages, and the carrier may comprise an HTML page containing user content. The agent may comprise a web page-enabled application embedded in the HTML page.

20 Claims, 2 Drawing Sheets

(56) References Cited

U.S. PATENT DOCUMENTS

| | | | |
|---|---|---|---|
| 6,996,548 B2 | 2/2006 | Ratcliff, III | |
| 7,801,944 B2* | 9/2010 | Shuster | 709/203 |
| 2001/0047384 A1 | 11/2001 | Croy | |
| 2002/0007394 A1 | 1/2002 | Bertolus et al. | |
| 2002/0016835 A1 | 2/2002 | Gamerman | |
| 2002/0019844 A1 | 2/2002 | Kurowski et al. | |
| 2002/0091752 A1 | 7/2002 | Firlie | |
| 2002/0099818 A1 | 7/2002 | Russell et al. | |
| 2002/0112048 A1* | 8/2002 | Gruyer et al. | 709/224 |
| 2002/0198962 A1 | 12/2002 | Horn et al. | |
| 2003/0067480 A1 | 4/2003 | Gao et al. | |
| 2003/0120727 A1 | 6/2003 | Mentchoukov | |

OTHER PUBLICATIONS

Finkel, et al., "An Applet-Based Anonymous Distributed Computing System," Proceedings of the International Network Conference 2000, Jul. 2000, 11 pages.

Long Yang and Chungmin Chen, "JAM:High Performance Internet Computing with Massive Java Applets," 1999 ICDCS Workshop on Electronic Commerce and Web-Based Applications, 1999, 6 pages.

World Wide Web Consortium. "HTML 4.01 Specification", section 13 "Objects, Images, and Applets", released Dec. 24, 1999, 25 pages.

Sun Microsystems, Inc. "Applets", publicly posted Apr. 29, 1999, from http://web.archive.org/web/19990429211711/http://java.sun.com/applet-s/, 2pages. [Retrieved Apr. 12, 2008].

Ron Hipschman, "How SETI@homeworks," publicly posted Mar. 3, 2000, http://web.archive.org/web/20000303114553/setiathome.berkeley.edu/about.s- ub.--seti/about.sub.--seti.sub.--at.sub.--home.sub.--1.html, 2 pages. [Retrieved Sep. 30, 2007].

W. T. Sullivan, et al., "A new major SETI project based on Project Serendip data and 100,000 personal computers," originally published in "Astronomical and Biochemical Origins and the Search for Life in the Universe", Proc. of the Fifth Intl. Conf. on Bioastronomy = IAU Colloq. No. 161, 1997, 4 pages.

Denis Howe "plug-in," Free On-Line Dictionary of Computing, publicly posted May 25, 1996, 1 page.

* cited by examiner

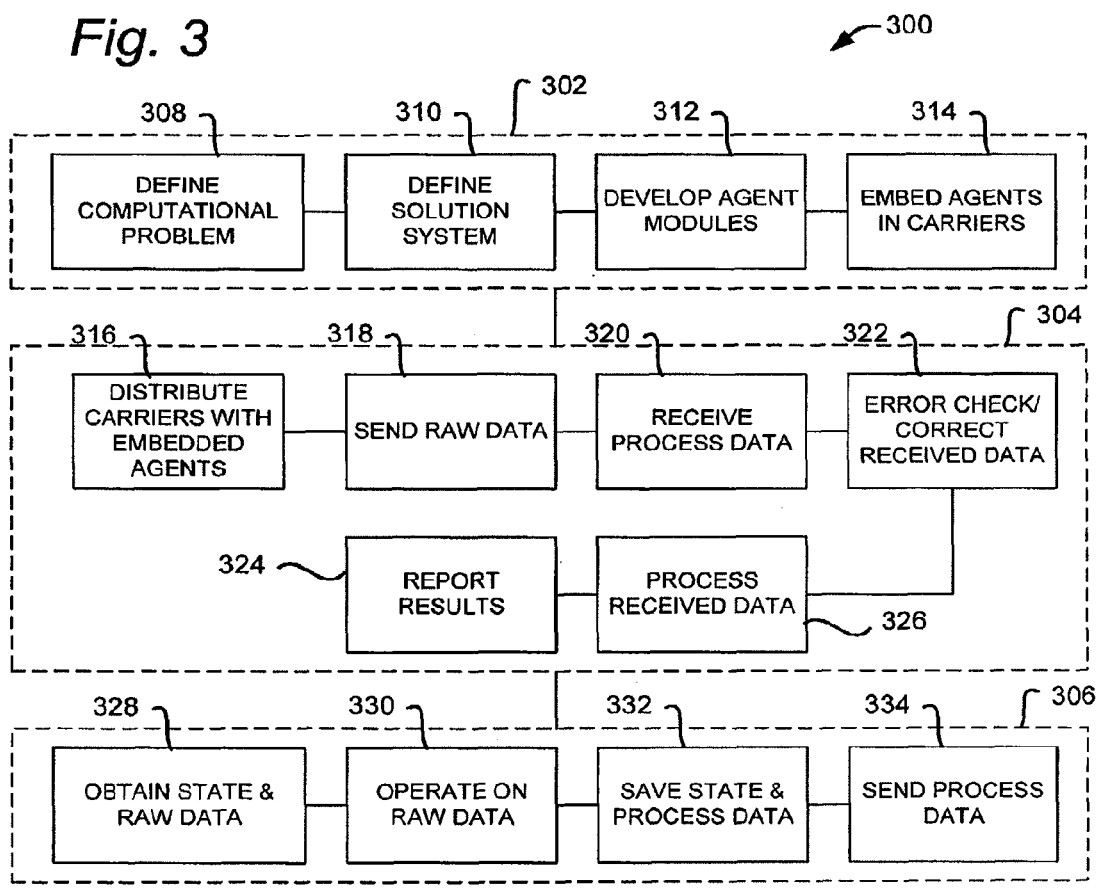

DISTRIBUTED COMPUTING BY CARRIER-HOSTED AGENT

CROSS-REFERENCE TO RELATED APPLICATIONS

This application is a continuation of U.S. patent application Ser. No. 12/886,827, filed Sep. 21, 2010, which is a continuation of U.S. patent application Ser. No. 10/151,810, filed May 20, 2002, now U.S. Pat. No. 7,801,944, which claims priority pursuant to 35 U.S.C. §119(e) to U.S. Provisional Application No. 60/291,879, filed May 18, 2001, all of which are specifically incorporated herein, in their entirety, by reference.

BACKGROUND OF THE INVENTION

1. Field of the Invention

The present invention relates to methods and applications for implementing remote, distributed computing systems over a wide area network.

2. Description of the Related Art

Various types of distributed computing systems have been developed for distributing integrated computing processes over disparate computing resources connected by a network. Distributed systems have been adapted for many different types of networks, including for public, wide area networks such as the Internet. The Internet in particular represents a distributed computing resource that is already larger than seemed conceivable just a decade ago. Yet, the Internet still has tremendous growth potential in at least three parameters, each of which can increase the power and speed of distributed computing: (1) the population of network nodes; (2) the computing power available at each node; and (3) bandwidth. The multiplicative effect of continued growth in these three parameters means that the computing resources available for distributed computing should continue to expand at an astonishingly rapid pace for the foreseeable future.

Nonetheless, prior methods and systems designed to use Internet resources for distributed computing have been quite limited in scope. Some systems have been successful, for example, the system operated by the SETI@home project, about which more information is available at http://setiathome.ssl.berkeley.edu/. Each of these prior systems requires that each Internet client in the network download (or otherwise receive) and install agent software on each participating client node. Because the active participation of individual users is required to initiate a client node, prior art systems are unlikely to ever harness more than a tiny fraction of the distributed computing resources available on the Internet. Most users will simply never take the time to install agent software for which they will receive little or no direct benefit. This is particularly true when the distributed resources are desired for private use, instead of for public research or charitable uses for which users may perceive a public or charitable benefit. Some have proposed providing payments or other incentives for use of a client node, but it is doubtful that compensation at levels that are economically sustainable will ever be sufficient to motivate widespread initiation of client nodes. Furthermore, the operation of a payment or incentive program may impose a substantial administrative burden on the system operator.

It is desirable, therefore, to provide a method and system for distributing computing over the Internet, that overcomes the limitations of prior art methods and systems for distributed computing.

SUMMARY OF THE INVENTION

The present invention provides a method and system for distributed computing using carrier-hosted agents that may be implemented over wide area networks, such as the Internet. A system according to the invention is capable of automatically promoting client node populations for distributed computing, without requiring any active participation by operators of the client nodes. At its most basic conceptual level, a system according to the invention operates by attaching a distributed computing agent to information, software, or hardware that users will desire to access and/or install on an Internet-connected computer. Preferably, the distributed agent is one that will operate with minimal or no noticeable effect observable at the client level.

A distributed agent essentially comprises code that is capable of operating autonomously on a client node to perform computing operations determined by a solution algorithm of a distributed computing system, as known in the art. Core functions of an agent for distributed computing typically include receiving raw data from a distributed system, processing the data, and sending the processed data back to an appropriate node of the distributed system. Other agent functions may include periodically writing data and state information to a client-side file, and checking for state information upon initiation. Of course, agent software may perform functions other than core functions, for example, an agent may provide an interface for a client-side operator to view state information and/or set processing parameters.

The desired information, software, or hardware to which agents are attached, herein called "carriers," may be virtually anything that users will desire to use on a client node. Examples include a chip on a system motherboard or add-on board, client operating system software, client application software, email messages, web pages, and so forth. The relationship is comparable to that between "Trojan-horse" information and a computer virus, but is distinct in that, unlike computer viruses, agents are designed to carry out useful work in a benign fashion, and, unlike Trojan-horse information, agent carriers are designed to be beneficial to the client. Express or implied consents may be obtained from users at client nodes as part of the carrier distribution scheme, to alleviate any concerns about unauthorized use of client resources. While a system according to the invention may be employed without any involvement by client operators, it may also be adapted to allow as much involvement as desired. For example, operators may be asked to consent to the automatic installation and operation of the software agents when the operators subscribe to a host site, such as by a "click-through" license agreement.

In an embodiment of the invention, the agents are hosted by a carrier comprising a web page, which may be included in a collection of related web pages comprising a web site. Agents are embedded in web pages that contain content requested by visitors to the web site, and are configured to execute automatically when the requested web page is loaded by the user's browser application. The agents preferably reside on a hidden or minimized browser page, or frame of a browser page, on the client node.

Accordingly, the present invention provides a method and system of distributed computing, suitable for private use in a public environment. A more complete understanding of the use of carrier-hosted agents for distributed computing applications will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 3 is a process diagram showing layers of a method for distributed computing using carrier-hosted agents, and exemplary steps that may be performed in the respective layers.

DETAILED DESCRIPTION OF THE PREFERRED EMBODIMENT

The present invention provides a method and system for distributing computing using carrier-hosted agents, that overcomes the limitations of the prior art, thereby enabling more effective and widespread use of distributed computing resources than has heretofore been possible.

Figure 1:
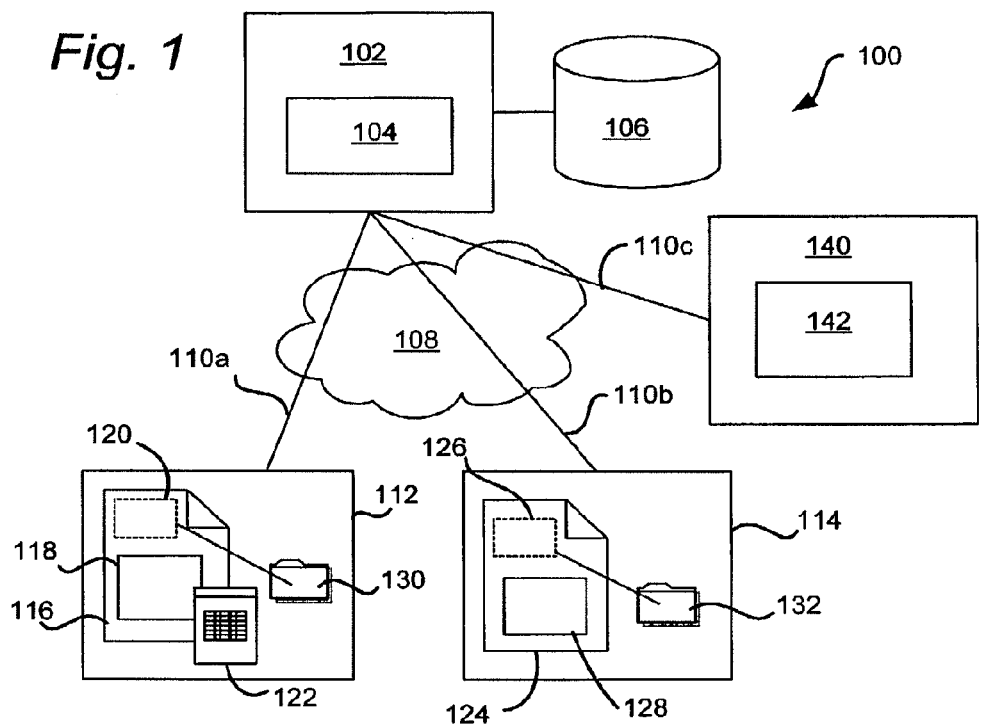
FIG. 1 is a web diagram showing elements of a system for distributed computing using carrier-hosted agents.

Elements of a system 100 for distributed computing using carrier-hosted agents are shown in FIG. 1. System 100 comprises a host server 102 performing a host layer process 104 according to software stored on any suitable storage media of memory 106. Server 102 may comprise any suitable general purpose computer adapted for use as a network server, and is connected to a wide area network, such as the Internet, by communication links 110a-c. In the alternative, host layer process 104 may be distributed across a plurality of computers (not shown) connected to network 108.

Any number of other computing devices may be connected to network 108 and communicate with one another through numerous communication links, and numerous additional elements may be incorporated into system 100. Various suitable network architectures, communication protocols, and methods are known in the art, and the present invention may be adapted for use with virtually any network configuration.

Computers 112, 114 are also connected to network 108 and possess computing resources potentially available for use as client nodes of a distributed computing system. In an embodiment of the invention, each computer operates a browser application such as known in the art for communicating with other computers connected to network 108. Browser applications typically include a graphical user interface (GUI) with provisions for displaying hypertext mark-up language (HTML) files within a window or frame of the user interface.

In an embodiment of the invention, an HTML page 116 is received from server 102 by computer 112, and displayed by a browser application. Any suitable mark-up language or document format language may be used for page 116, including but not limited to XHTML and VRML. A page-enabled agent application 120, such as a Java™ applet, is embedded in page 116 and begins to execute when the page 116 is opened, to perform the function of an agent in a distributed computing system.

It should be appreciated that numerous methods may be employed to embed an agent in a content page, such as pages 116, 124. It is not necessary that the agent be coded in its entirety in the content page. In an alternative embodiment, the agent 120 is not hard-coded in page 116 as it is received from host layer 104. Instead, the agent is loaded into an active page of the user's browser application by an object on page 116. In other words, the agent application 120 is called by page 116. For example, under some browser standards, the agent may be loaded into an i-frame of page 116 after it is opened by the browser. An i-frame is a page frame for which content is retrieved from an external source as specified in the page. For further example, page 116 may contain an agent-loading application that is not itself an agent. Instead, the agent loading application obtains and loads the agent application from a source specified in the loading application.

The agent-calling embodiment has the advantage of permitting a distributed computing system operator to readily control the operation of agents across clients receiving web pages from multiple different sources. An agent-calling scheme would operate in much the same way as the control of prior-art Internet advertising banner content, that can be controlled by a single third-party marketing company, instead of by the individual web sites from which the web pages with advertising banners are received. Thus, the agents can be revised as often as desired by the system operator, without any need to alter web pages containing user content, such as pages 116 and 128. This ability to control agents called from the web pages of multiple independent web sites may make a distributed system according to the invention much easier to scale up and to control, and therefore may be especially preferred for large scale, flexible distributed systems. Indeed, it is conceivable that, by using an agent-calling architecture, a distributed computing system operator could aggregate and sell (or otherwise use) distributed computing resources using a centralized control system, in much the same way as the content of advertising banners, pop-up windows, and the like are aggregated and controlled today. Such a system could be reprogrammed "on the fly" for solving different computing problems, merely by substituting different agents for those previously called by the content pages.

Whether is called by page 116, or hard-coded into it, the agent application 120 may operate in different ways. In an embodiment of the invention, the applet embedded in or called by page 116 causes a pop-up window 122 to appear. The pop-up window may contain any desired message, and/or may permit the user a degree of control over the agent process. For example, a user may be permitted to disable certain agent operations, if desired. For many applications, however, a visible pop-up window may not be necessary, or even desirable.

Page 116 also contains content 118 that may be completely unrelated to the function of the page-enabled application. In essence, the embedded agent 120 is hosted by the content, because it is the presence of the content that motivates a user of the computer 112 to request page 116 from server 102. In exchange for receiving the requested content, the user accepts the embedded agent carried on the same page, in much the same fashion as users accept advertising banners and the like.

In an embodiment of the invention, the embedded agent is less noticeable to a user at the client computer than an advertising banner. Preferably, the agent is configured in a manner that is likely to be unnoticed by a user, by limiting the agent's use of resources at the client computer. For example, the agent may be configured to be invisible, to use only idle microprocessor cycles, and to limit its use of memory to a specified amount, or to a specified portion of available resources.

Furthermore, content 118 is the feature of interest to the user, so for this additional reason, it may be desirable to configure the embedded agent to be concealed from the user's view. A concealment strategy is implemented at computer 114, displaying a page 124 containing a concealed agent 126 and displayed content 128. Agent 126, like agent 120, begins to execute when page 124 is opened. It may be concealed in any suitable manner, for example, by opening it or placing it in a "passive popup" window behind page 124. Passive popup windows are described in more detail in co-pending U.S.

application Ser. No. 09/419,698 filed on Oct. 14, 1999, which is incorporated herein by reference. The passive popup window may be configured to be and remain minimized and/or hidden even when an attempt is made to make it visible or bring it to the forefront. The agent may also be concealed by opening it in a hidden frame of page 124.

Agents 120, 126 may be configured to operate for so long as the session in which they are launched continues; e.g., until the client computer is disconnected from the network 108, turned off, or rebooted. This permits individual users to readily shut down an agent process in the event that it causes a conflict with another process operating on the client computer. The client computer then ceases to participate in the distributed computing system until such time as a page containing an embedded agent is again requested from the host layer 104.

A disadvantage of limiting the operation of agents in this manner may be that the operational life of individual agents is likely to be relatively brief. This disadvantage may be ameliorated by continuously distributing additional agents with pages requested from the host layer. Thus, the amount of resources available to the distributed computing system will be a function of the rate at which pages are requested from the host layer and the average client-node session time. In turn, the amount of client resources consumed by the distributed computing system will bear a direct relationship to the amount and quality of network traffic that the host layer is able to attract by making carrier content available. Because the traffic at the host layer is likely to be related to the value that users place on the content available there, a distributed system according to this embodiment essentially performs a rationally based quid-pro-quo exchange of content for distributed computing resources. This may make the distributed system more likely to be aligned with public expectations and rules relating to transactions over public networks, without requiring users to expressly consent to installation of an agent.

In an alternative embodiment, the embedded agent causes an executable agent file to be stored on the client computer so as to be executed whenever the computer is booted up. This approach negates the necessity for users to request a page from the host layer to initiate an agent process, but may also be perceived as requiring the express consent of each individual user for legal and/or public relations reasons, which will tend to reduce the number of available clients. Even so, the invention according to this alternative embodiment may provide advantages relative to prior-art agent distribution systems, in that users may be spared the need to take any affirmative action to download an agent application. Instead, the agent is embedded in content that users request for other reasons, and individual users need only act passively, or in a minimal fashion, to consent to the installation of the executable agent as a regular process of their computers.

A variation of this embodiment would permit the agent to operate only during client sessions in which the carrier that hosts the agent is accessed or operated by the user at the client node. For example, the agent may be embedded in a freeware software application for performing a function desired by the user, and activated whenever the software application is executed. An application designed for continuous use and that consumes a limited, defined amount of resources, such as an application for displaying a stock ticker or the like, may be particularly appropriate. The agent may run in the background all the while the application is running in the foreground. Another example might be a computer game or application for streaming video or audio. For further example, the agent may be embedded in a hardware device, such as a video game device, that is installed in the client computer, and activated whenever the hardware device is operated. These approaches have the advantage of preserving a relationship between the amount that a client uses the carrier software or hardware, and the extent to which the client resources are used by the distributed computing system, possibly reducing requirements for obtaining users' express consents.

Whatever the distribution mode, but especially when distributed by embedding in web pages, both agents 120, 126 may be configured to read and write information to and from a "cookie" residing on their respective client computers, such as cookies 130, 132, respectively. A cookie is a file that contains one or more network addresses, for example, URL's, and any related information desired to be stored in relation to the identified address. When the client accesses a network address that is specified in the cookie, any related information in the cookie file is automatically sent to the specified address, as known in the art. Similarly, the cookie file can be automatically updated with information from a web host when the web host is contacted by the client.

Cookie-type protocols are normally used for providing user-specific information to websites, but may be adapted as a convenient way to exchange process data with other computers in a distributed computing network. By writing process data to a cookie file, an agent operating at a client node can thereby share the data with a host layer of a distributed system without any need to open up a separate communication link. The process data is simply read whenever the user connects to the host. Raw data may be provided to the client by the host in the same way; i.e., by automatically writing to a cookie on the client side.

If desired, cookie information may be broken into multiple files. In this scheme, a primary cookie is first read in a conventional manner. The primary cookie contains the locations of other related cookie files, which are then read or written to as desired. Either the host or agent may write to or read multiple cookie files. The use of multiple cookie files may be particularly useful for handling data that is encoded for error detection and correction, or that is encrypted for security.

To ensure that cookies 130, 132 are provided to the host layer as often as necessary, the pages containing agents 120, 126 may be automatically refreshed at periodic intervals, thereby causing the information in cookies 130, 132 to also be automatically exchanged.

In the alternative, the agent may open up a communication link to the host layer whenever an exchange of information is desired. This approach may allow for exchange of data at time other than when pages 116, 124 are open. However, the agent will tend to require more complex coding to handle the communication scheme, which may be undesirable. In general, agents should be relatively compact so as to not unduly increase the size of the carriers that host them and to be less noticeable when installed and operating on a client node.

System 100 may further include a computer 140 for operating an origination layer 142 of a distributed computing system. The origination layer designs the solution algorithms to be executed by the distributed computing system, and may perform other system design tasks. Computational results may be reported to the origination layer, or to any other specified location. In the alternative, the origination layer 142 may operate in computer 102 with host layer 104, or be distributed across a plurality of computers connected to network 108.

In summary, it should be apparent that one of the distinctive features of system 100 is how the distribution of agents is handled. In each embodiment, the agent is embedded in content and distributed to client nodes as a result of users who request the content from the host layer. The users need not expressly consent to activation of the agent on a client node, and in some embodiments, may not even be aware that the agent is operating. Thus, a significant barrier to the distribution of the agents is overcome in a manner that is mutually beneficial to users and operators of distributed computing systems.

Figure 2:
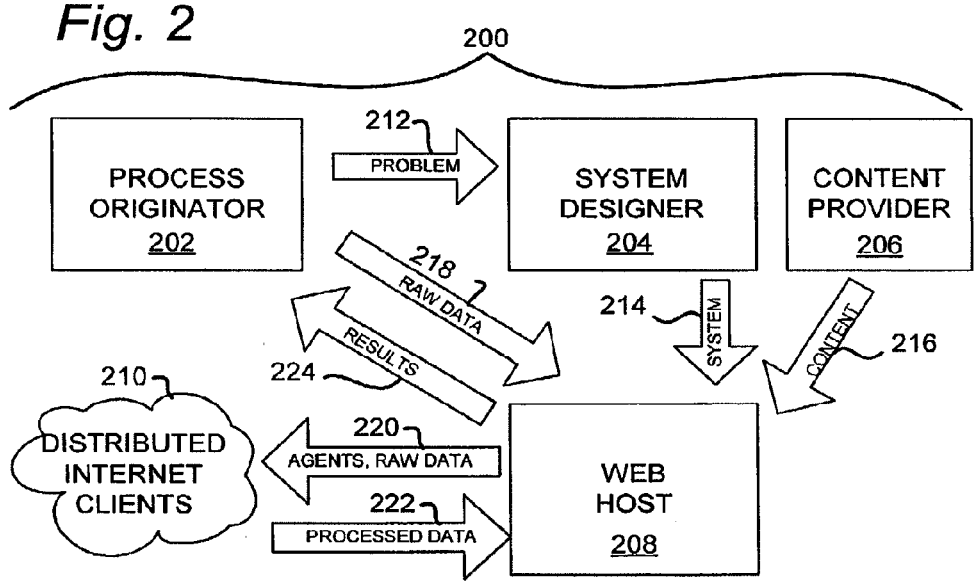
FIG. 2 is a block showing elements of a system for distributed computing using carrier-hosted agents.

FIG. 2 is a block showing elements of a system 200 for distributed computing using carrier-hosted agents. A process originator 202 defines the computational problem 212 to be solved, such as a technological problem requiring a massive number of computations or data manipulation as part of a solution algorithm. The process originator defines the parameters of the input data and desired results as part of stating the problem 212. Virtually any entity seeking to perform a computationally-intensive algorithm may play this role.

The process originator provides the problem 212 to a system designer 204, who generates a solution system 214. The solution system 214 includes a solution algorithm embodied in agents for distribution to client nodes, as well as management instructions for a host layer. The management instructions may include instructions for managing the distribution of raw data to the client nodes, the receiving of process data back from client nodes, error detection and correction of data, encryption of data, further processing of data at the host level, and reporting of results. For more efficient design, the solution system preferably comprises pre-existing software modules that are configured according to parameters specified by the system designer, and compiled together with standardized modules for communication, data correction, and so forth. The system designer 204 provides the solution system to web host 208.

The web host 208 operates the host layer for the distributed computing system, such as host layer 104 shown in FIG. 1. The web host integrates the solution system 214 from the system designer with content 216 received from a content provider 206. This integration includes configuring the content as carriers for the agents, and embedding the agents in the carriers. For example, a plurality of interlinked HTML pages comprising a web site may be created, and the agents embedded in the pages, or in selected ones of the pages. In the alternative, either of the system designer 204 or the content provider 206 may integrate the solution system 214 with content 216 and provide it to the web host 208.

As part of the host layer, the web host may operate a web site to attract network traffic for the distribution of agents. After initiating the host layer, agents and raw data 220 are distributed to client nodes along with content requested by the client nodes. Raw data 218 is received from the process originator 202 and distributed to clients 210 by the web host. The raw data may be embedded with the agents, and/or provided to the clients at the request of operational agents. The web host receives processed data 222 from the distributed clients 210, performs any further processing as specified by the solution system, and reports results 224 to the process originator as desired. Within this general framework, a great many variations are possible. It should be noted that the process originator 202, system designer 204, content provider 206, and web host 208 need not belong to separate entities. Even the distributed clients 210 need not belong to separate entities; for example, a web host may distribute agents only to clients belonging to a private group connected to the Internet, or to a privately-owned network.

FIG. 3 is a process diagram showing layers of a method 300 for distributed computing using carrier-hosted agents, and exemplary steps that may be performed in the respective layers. Each layer may itself be considered to be a method or sub-process comprising the specified steps. Although the steps have been grouped into distinct layers, certain steps may be performed in more than one layer, or in a layer different from that specified. The organization into layers is intended to aid understanding of the invention, and not to impose limitations on how particular steps are performed. Many steps of method 300 may be performed in parallel, and so no arrows that might suggest that a particular sequence of steps is required have been included in the diagram of FIG. 3. Where a particular sequence of steps may be logically required, this will be clear from the context.

In an origination layer 302, a computational problem is defined at step 308. The computational problem is the creative requirement that drives method 300, and contains a computational goal or goals. At step 310, a solution system, comprising one or more solution algorithms to be executed by distributed agents, is defined. The design process may incorporate ideas and programming methods as known in the art of distributed computing, together with a design for embeddable agents as described herein.

At step 312, the agent modules are developed and programmed with the desired solution algorithm. Again, any suitable programming method or language may be used. Preferably, the programming language selected is designed to be machine-independent, such as Java™, so that agents may be distributed to machines of different types. Each agent should be designed to operate independently in the anticipated machine environment, as soon as conditions required for activation have been met. For example, in an embodiment of the invention, the activation condition is fulfilled when an HTML page containing the agent is loaded into a client machine by a browser.

At step 314, agents are embedded in a selected carrier. Because of their self-executing properties, HTML-type web pages make suitable carriers. In such case, the embedding process occurs as part of the authoring of the web pages. The web pages with embedded agents may be included in a set of interlinked, related web pages making up a web site. Web content may be integrated into the pages at this step. Preferably, the web content is of a type that will attract a large amount of traffic to the site. Web portals, search engines, and entertainment sites provide but a few examples. For a members-only site, express consent to the use of agents at client sites may be obtained from users through a user registration process, which may also be implemented using web pages.

Steps for hosting and managing operation of a distributed computing system may be considered as comprising a hosting layer 304. The hosting layer may itself be performed by a distributed resource over the network, such as by several independent machines, or on a single machine. Certain steps, such as the distribution of agents, need not be performed by a computing machine at all, or may involve the use of additional instrumentalities. For example, step 316 may be performed by distributing a software application on a disc media through the mail. In a preferred embodiment of the invention, however, the distribution of carriers is performed entirely by a computer through the operation of a web site, as previously described.

At step 318, raw data is sent to the client nodes to which agents have been or will be distributed. For certain applications, it may be desirable to encrypt the raw data before sending to a client node. As previously described, cookie files may be utilized for distribution of raw data. In the alternative, raw data may be streamed to an operational agent. Generally, it may be preferable to send raw data only when requested by an operational agent, for greater control of the data. Also, to facilitate management of the computational process, data should be provided in packets having an optimal size, which may vary depending upon conditions at individual clients as well as the operating state of the distributed system as a whole. As packet size decreases, management and communication burdens generally increase; conversely, larger packets may overload client nodes and make it more difficult to coordinate and balance processing across the system. Various methods for managing data flow may be applied, as known in the art.

At step 320, process data returned by the distributed agents is received at a designated processing location. Again, cookie files or streaming may be employed for data transfer, or any other suitable method. At step 322, the received data may be decoded, checked for errors, and corrected using any suitable method. Received data may also be decrypted prior to being decoded. At step 326, the received data may also undergo further processing at the host level as required by the solution system, or be sent again as raw data to distributed agents for another round of computation. Finally, results as defined by the origination layer are reported to a specified location at periodic intervals, or when processing has been completed for specified sets of raw data.

Meanwhile, at the client nodes, the distributed agents perform steps comprising an agent layer 306. Upon being activated, each agent may obtain the current calculation state and raw data from processing from a file previously placed on the client node by the host layer, or by sending a request for data to the host layer. After obtaining raw data, the agent operates on the raw data at step 330 to produce process data according to instructions determined by the solution algorithm of the solution system defined at step 310. Raw data may be decrypted and/or decoded for error detection and correction, prior to processing by the agent.

During processing step 330, the agent may periodically save process data and state information to a client-side file, such as a cookie file, at step 332. Of course, data also may be saved whenever the agent process is finished or terminated. Prior to saving and/or ending process data, the process data may be encoded for error detection and correction at the host level, and/or encrypted.

At periodic times or whenever processing is completed, the agent may send the process data back to the host layer and/or request additional raw data at step 334. In the alternative, the process data may reside in the cookie file until the address associated with the cookie is sent by the browser, for example, by using a periodic meta-refresh command or a refresh command generated by a calculation script to refresh an active web page containing the address.

Having thus described a preferred embodiment of a method and system for distributed computing using carrier-hosted agents, it should be apparent to those skilled in the art that certain advantages of the within system have been achieved. It should also be appreciated that various modifications, adaptations, and alternative embodiments thereof may be made within the scope and spirit of the present invention. For example, a system employing agents carried by web pages provided by a web host has been illustrated, but it should be apparent that the inventive concepts described above would be equally applicable to other carrier-hosted systems. The invention is further defined by the following claims.

What is claimed is:

1. A method comprising:
    transmitting to a computing device, from a central computing device, an agent configured to perform a processing function on the computing device without user interaction with the agent, wherein the agent is transmitted with one or more web pages requested by the computing device and is transmitted without requiring a user of the computing device to expressly consent to installation of the agent, and wherein the processing function is unrelated to at least some content of the one or more web pages requested by the computing device;
    providing raw data to the computing device; and
    receiving processed data from the computing device in response to the agent processing the raw data at the computing device.

2. The method of claim 1, wherein the agent is configured to execute via a hidden window that is separate from the one or more web pages.

3. The method of claim 1, wherein the agent is configured to be executed in response to boot up of the computing device.

4. The method of claim 1, wherein the agent performs a plurality of subtasks of a single distributed task.

5. The method of claim 1, wherein providing the raw data to the computing device and receiving the processed data from the computing device occurs via one or more cookie files associated with the one or more web pages.

6. The method of claim 5, wherein the one or more cookie files specify one or more network addresses and are configured to store one or more of the raw data and the processed data in associated with the one or more network addresses.

7. The method of claim 1, wherein the processed data from the computing device is received at the central computing device.

8. A computing system, comprising:
    a processor; and
    a non-transitory computer readable medium having stored thereon instructions that are executable by the processor to cause the computing system to:
        transmit, to a computing device, an agent configured to perform a processing function on the computing device without user interaction with the agent, wherein the agent is transmitted as a portion of one or more web pages and without requiring a user of the computing device to expressly consent to installation of the agent, and wherein the processing function is unrelated to at least some content of the one or more web pages;
        provide raw data to the computing device; and
        receive processed data from the computing device in response to the agent processing the raw data at the computing device.

9. The computing system of claim 8, wherein the agent is configured to execute in a hidden window that is separate from the one or more web pages.

10. The computing system of claim 8, wherein the agent is configured to cease executing on the computing device in response to a user of the computing device closing a browser that displays the one or more web pages.

11. The computing system of claim 8, wherein the agent is configured to communicate with the computing system, without the use of a separate communication link, via a link used by the computing system to transmit the one or more web pages to the computing device.

12. The computing system of claim 11, wherein the computing system is configured to use the link to receive the processed data from a cookie file on the computing device.

13. The computing system of claim 8, wherein the stored instructions include web server software, and wherein the computing system is configured to provide the one or more web pages via the web server software.

14. The computing system of claim 8, wherein the one or more web pages are configured to automatically refresh at one or more intervals, wherein an automatic refresh of the one or more web pages causes one or more of the raw data and the processed data to be exchanged between the computing system and the computing device.

15. A tangible, non-transitory computer-readable medium having stored thereon instructions that are executable by a processor of a computing system to cause the computing system to perform operations comprising:
   transmitting, to a computing device, an agent configured to perform a processing function on the computing device without user interaction with the agent, wherein the agent is transmitted with one or more web pages requested by the computing device and is transmitted without requiring a user of the computing device to expressly consent to installation of the agent, and wherein the processing function is unrelated to at least some content of the one or more web pages requested by the computing device;
   providing raw data to the computing device; and
   receiving processed data from the computing device in response to the agent processing the raw data at the computing device.

16. The tangible, non-transitory computer-readable medium of claim 15, wherein the agent is configured to execute in a hidden window that is separate from the one or more web pages.

17. The tangible, non-transitory computer-readable medium of claim 15, wherein the agent is configured to execute in response to boot up of the computing device.

18. The tangible, non-transitory computer-readable medium of claim 15, wherein the operations further comprise causing the process data to be received in response to execution of a script on at least one of the one or more web pages.

19. The tangible, non-transitory computer-readable medium of claim 15, wherein the agent is configured to communicate processed data to the computing system via a cookie file on the computing device.

20. The tangible computer-readable medium of claim 15, wherein the agent is configured to be distributed to a plurality of client computing devices via a plurality of different websites, wherein the agent is configured to execute on the plurality of client computing devices to solve a common task.

* * * * *

UNITED STATES PATENT AND TRADEMARK OFFICE
CERTIFICATE OF CORRECTION

PATENT NO.       : 8,572,158 B2  
APPLICATION NO.  : 13/342838  
DATED            : October 29, 2013  
INVENTOR(S)      : Shuster It is certified that error appears in the above-identified patent and that said Letters Patent is hereby corrected as shown below:

In the Specification

In Column 6, Line 61, delete "computer 102" and insert -- computer 140 --, therefor.

In the Claims

In Column 12, Line 11, in Claim 18, delete "process" and insert -- processed --, therefor.

In Column 12, Lines 14-15, in Claim 19, delete "communicate" and insert -- communicate the --, therefor.

In Column 12, Line 17, in Claim 20, delete "tangible computer-readable" and insert -- tangible, non-transitory computer-readable --, therefor.

Signed and Sealed this
Twenty-sixth Day of August, 2014

Michelle K. Lee
*Deputy Director of the United States Patent and Trademark Office*